United States Patent [19]

Mbah

[11] Patent Number: 4,882,398
[45] Date of Patent: Nov. 21, 1989

[54] OPTICALLY CLEAR REINFORCED ORGANOSILOXANE COMPOSITIONS

[75] Inventor: Godfrey C. Mbah, Midland, Mich.

[73] Assignee: Dow Corning Corporation, Midland, Mich.

[21] Appl. No.: 236,862

[22] Filed: Aug. 26, 1988

[51] Int. Cl.$^4$ .............................................. C08F 283/00
[52] U.S. Cl. ...................................... 525/478; 528/15; 528/31; 528/32
[58] Field of Search ................... 525/478; 528/15, 31, 528/32

[56] References Cited

U.S. PATENT DOCUMENTS

| | | | |
|---|---|---|---|
| 3,284,406 | 11/1966 | Nelson | 260/46.5 |
| 3,436,366 | 4/1969 | Modic | 260/37 |
| 4,500,584 | 2/1985 | Modic | 428/145 |
| 4,529,789 | 7/1985 | Kroupa | 525/478 |
| 4,535,141 | 8/1985 | Kroupa | 525/478 |

*Primary Examiner*—Melvyn I. Marquis
*Attorney, Agent, or Firm*—Robert Spector

[57] ABSTRACT

The presence of up to about 40 percent by weight of a resinous organosiloxane copolymer consisting essentially of trimethylsiloxy, dimethylvinylsiloxy and SiO$_2$ units in a diorganovinylsiloxy-terminated polydiorganosiloxane containing at least 95 mol percent of dimethylsiloxane units and having a viscosity greater than about 12 Pa.s at 25 degrees C., unexpectedly decreases the viscosity of the mixture relative to the viscosity of the polydiorganosiloxane. Elastomers obtained by curing these mixtrues using an organohydrogensiloxane in the presence of a platinum-containing hydrosilation catalyst are transparent and particularly suitable for fabrication or incorporation into optical devices such as windows, windshields and lenses.

6 Claims, No Drawings

OPTICALLY CLEAR REINFORCED ORGANOSILOXANE COMPOSITIONS

BACKGROUND OF THE INVENTION

1. Field of the Invention

This invention relates to organosiloxane compositions that cure by a platinum-catalyzed hydrosilation reaction to form optically clear elastomers. More particularly, this invention relates to curable organosiloxane compositions that are reinforced using a specified class of organosiloxane copolymers and exhibit an unexpected decrease in viscosity with increasing concentration of these copolymers.

2. Description of the Prior Art

It is known to improve the tensile properties of organosiloxane elastomers, particularly tensile strength and tear strength, by including in the curable compositions used to prepare these elastomers a finely divided reinforcing filler such as fume or precipitated silica.

Another method for improving the tensile properties of cured organosiloxane elastomers prepared from compositions that cure by a platinum-catalyzed hydrosilation reaction is to include in the curable composition a resinous organosiloxane copolymer containing $SiO_2$ units and vinyl-containing siloxane units.

U.S. Pat. No. 3,436,366, which issued to Modic on Apr. 1, 1969 discloses organosiloxane compositions yielding cured elastomers exhibiting tear strengths greater that 60 pounds per linear inch (10.5 kilonewtons per meter). The compositions contain a polydiorganosiloxane having vinyl radicals at the terminal positions, an organosiloxane copolymer with $SiO_2$, triorganosiloxy and, optionally, diorganosiloxane units, an organohydrogensiloxane in an amount sufficient to cure the composition, a platinum-containing hydrosilation catalyst in an amount sufficient to promote curing of the composition and an optional filler. Either or both of the diorganosiloxane and triorganosiloxane units comprising the organosiloxane copolymer contain a vinyl radical.

One of the two exemplified organosiloxane copolymers in the aforementioned patent to Modic contains $SiO_2$, trimethylsiloxy and methylvinylsiloxy units. Elastomers prepared by curing compositions containing this copolymer, a dimethylvinylsiloxy-terminated polydimethylsiloxane having a viscosity of 3.3, 80 or 550 Pa.s at 25° C. and no reinforcing filler exhibited tear strengths of 22, 64 and 80 ppi, respectively. Example 15 of this patent discloses a composition containing a diphenylvinylsiloxy-terminated dimethylsiloxane/diphenylsiloxane copolymer having 3 diphenylsiloxane units per 100 dimethylsiloxane units and exhibiting a viscosity of 150 Pa.s at 25° C. In this instance the aforementioned organosiloxane copolymer contained $SiO_2$, dimethylvinylsiloxane, methylvinylsiloxane and trimethylsiloxy units, and the reported tear strength of a cured elastomer prepared by curing the composition was "in excess of 60 p.p.i.", however no absolute value is reported.

U.S. Pat. No. 4,500,584, which issued to Modic on Feb. 19, 1985 discloses dirt-resistant silicone coating compositions curable by a platinum-catalyzed hydrosilation reaction. The compositions comprise a vinyl-terminated polydiorganosiloxane having a viscosity of up to 2,000 Pa.s wherein at least 50 percent of the silicon-bonded hydrocarbon radicals are methyl and a vinyl-containing organosiloxane copolymer consisting essentially of triorganosiloxy and optionally diorganosiloxane units in combination with $SiO_2$ units. All of the exemplified copolymers contain only trimethylsiloxy, methylvinylsiloxy and $SiO_2$ units.

U.S. Pat. No. 3,284,406, which issued to Nelson on Nov. 8, 1966 discloses compositions consisting essentially of (1) a vinyl terminated polydiorganosiloxane having a viscosity of from 500 to 500,000 centistokes wherein at least 80 percent of the silicon-bonded hydrocarbon radicals other than vinyl are methyl and any remainder are phenyl, (2) an organosiloxane copolymer containing specified proportions of trimethylsiloxy, dimethylsiloxy and $SiO_2$ units, (3) an organohydrogensiloxane curing agent and (3) a platinum-containing hydrosilation catalyst. The two exemplified polydiorganosiloxanes have viscosities of 2,000 centistokes and 9.000 centistokes.

The organosiloxane copolymers disclosed in the aforementioned patents to Modic and Nelson are typically solid, resinous materials under ambient conditions, and their presence in curable organosiloxane compositions would be expected to increase the viscosity of these compositions relative to the viscosity of the unmodified polydiorganosiloxane. This effect is observed with both of the polydiorganosiloxanes exemplified in the aforementioned Nelson patent.

An objective of this invention is to provide curable organosiloxane compositions yielding optically clear elastomers that exhibit substantially superior tensile properties relative to elastomers prepared from prior art curable compositions of comparable viscosity.

SUMMARY OF THE INVENTION

The present inventor discovered that the presence of up to about 40 percent by weight of a resinous organosiloxane copolymer consisting essentially of trimethylsiloxy, dimethylvinylsiloxy and $SiO_2$ units in a diorganovinylsiloxy-terminated polydiorganosiloxane containing at least 95 mol percent of dimethylsiloxane units and having a viscosity greater than about 12 Pa.s at 25° C. unexpectedly decreases the viscosity of the mixture relative to the viscosity of the polydiorganosiloxane. Cured elastomer prepared from curable compositions containing these mixtures exhibit better tensile properties relative to elastomers prepared from prior art curable compositions of comparable viscosity. Some of these prior art compositions comprise a polydiorganosiloxane in combination with vinyl-containing organosiloxane copolymers other than those of the present invention as the reinforcing agent.

DETAILED DESCRIPTION OF THE INVENTION

This invention provides an improved curable composition comprising 1. a diorganovinylsiloxy-terminated polydiorganosiloxane,
2. an amount of a resinous organosiloxane copolymer sufficient to improve the physical properties of the elastomer obtained by curing said composition,
3. an amount of an organohydrogensiloxane sufficient to cure said composition, and
4. an amount of a platinum-containing hydrosilation catalyst sufficient to promote curing of said composition, where the improvement comprises (a) selecting said polydiorganosiloxane from those exhibiting a viscosity of at least 12 Pa.s at 25° C. and wherein at least 95% of the repeating units are dimethylsiloxane units and any remainder are diorganosiloxane units wherein the organic groups bonded to silicon are monovalent hydrocarbon radicals or monovalent halogenated hydrocarbon radicals (b) selecting said organosiloxane copolymer from those consisting essentially of $SiO_2$, trimethylsiloxy and dimethylvinylsiloxy units, where the molar ratio of the combination of trimethylsiloxy and dimethylvinylsiloxy units to $SiO_2$ units is from 0.6 to 1.1 and said copolymer contains from 1.5 to 3.5 weight percent of vinyl radicals, and (c) maintaining the concentration of said organosiloxane copolymer within the range of from 1 to about 45 weight %, based on the weight of said polydiorganosiloxane, to achieve a reduction in the viscosity of said composition relative to the viscosity of the composition in the absence of said copolymer.

The Characteristic Feature of the Present Compositions

The feature that distinguishes the present curable compositions from others of the prior art containing similar ingredients is the reduction in viscosity observed when the polydiorganosiloxane ingredient is combined with the vinyl-containing organosiloxane copolymer of this invention within the limits specified hereinabove. The copolymer can serve as the sole reinforcing agent for the composition and is a typically a solid at ambient temperature.

In accordance with the present invention the viscosity of the unmodified polydiorganosiloxane gradually decreases as organosiloxane copolymer is added until the concentration of copolymer reaches between about 30 and about 45 percent by weight of the mixture, depending upon the molecular weight of the polydiorganosiloxane. At this point the viscosity of the mixture increases in the expected manner with the further addition of organosiloxane copolymer.

The maximum concentration of organosiloxane copolymer beyond which the viscosity of a polydiorganosiloxane/copolymer increases with increasing concentration of the copolymer appears directly proportional to the molecular weight of the polydiorganosiloxane.

The unique phenomenon of viscosity reduction with increasing copolymer content is only observed when the molecular weight of the polydiorganosiloxane is at least about 30,000, which is equivalent to a viscosity of about 50 Pa.s for a triorganosiloxy terminated polydimethylsiloxane. There does not appear to be an upper molecular weight limit for the polydiorganosiloxane, based on the fact that the phenomenon is observed using gum type polydiorganosiloxanes of this invention having a molecular weights of several million.

While not wishing to be bound by any theory, the present inventor believes the observed reduction in viscosity to result from solubilization of the solid organosiloxane copolymer by the polydiorganosiloxane. There is apparently a molecular weight limit below which the polydiorganosiloxane will not dissolve appreciable amounts of this copolymer, which would account for the present lower molecular weight limit for the polydiorganosiloxane. The maximum amount of copolymer that can be dissolved by a given polydiorganosiloxane determines the copolymer concentration at which the viscosity of a blend of the copolymer and the polydiorganosiloxane begins to increase with increasing concentration of the copolymer.

The Polydiorganosiloxane

The major ingredient of the present curable compositions is a diorganovinylsiloxy-terminated polydiorganosiloxane exhibiting a viscosity of at least 12 Pa.s at 25° C. At least 95% of the diorganosiloxane units of this polymer are dimethylsiloxane units and any remaining units are diorganosiloxane wherein the organic groups bonded to silicon are monovalent hydrocarbon radicals or monovalent halogenated hydrocarbon radicals. These hydrocarbon and halogenated hydrocarbon radicals are typically free of ethylenic unsaturation and contain from 1 to 10 or more carbon atoms. Typical monovalent hydrocarbon radicals include but are not limited to alkyl such as methyl, ethyl, hexyl and octyl; cycloalkyl such as cyclohexyl, aryl such as phenyl and naphthyl, alkaryl such as tolyl and xylyl and aralkyl such as benzyl. Typical halogenated hydrocarbon radicals include chloromethyl, 1-bromoethyl and 3,3,3-trifluoropropyl.

Preferred hydrocarbon radicals include methyl and phenyl and the preferred halogenated hydrocarbon radical is 3,3,3-trifluoropropyl, these preferences being based on the availability of the intermediates used to prepare these polydiorganosiloxanes.

The polydiorganosiloxanes can be represented by the general formula

where Me represents methyl, Vi represents vinyl, R represents a monovalent hydrocarbon radical or a monovalent halogenated hydrocarbon radical as defined hereinbefore, R' is selected form the same group as R, the sum of x and y is at least 400 and the value of y is from 0 to 0.05(x+y), inclusive.

Polydiorganosiloxanes containing at least 95 mol % of dimethylsiloxane units and 400 repeating units typically have a viscosity of about 12 Pa.s at 25° C., the lower limit for the polydiorganosiloxanes of the present compositions.

As disclosed hereinabove, the viscosity of the polydiorganosiloxane can range from a pourable liquid to a gel that will flow only under pressure.

Methods for preparing the polydiorganosiloxanes of the present compositions are sufficiently well known to those skilled in this art that a detailed description in this specification is not required. These methods include (1) hydrolysis/condensation of a dimethyldihalosilane or a mixture of a dimethyldihalosilane and a diorganodihalosilane of the formula $R_2SiX_2$, and (2) polymerization of cyclic dimethylcyclosiloxanes or a mixture of dimethylcyclosiloxanes and at least one diorganocyclosiloxane of the formula $(R_2SiO)_a$, where R is defined hereinabove. X is halogen and the value of a is typically from 3 to about 6.

The Organosiloxane Copolymer

The organosiloxane copolymer of the present compositions contains repeating units of the general formula $SiO_2$ in addition to triorganosiloxy units of the general formulae $R''_3SiO_{\frac{1}{2}}$ and diorganovinylsiloxy units of the general formula $CH_2=CH(R''')_2SiO_{1/2}$. In these formulae $R''$ and $R'''$ represent individually monovalent hydrocarbon or halogenated hydrocarbon radicals containing from 1 to about 10 carbon atoms, as previously defined for the R radicals of the polydiorganosiloxane, and both R" and R'" are free of ethylenic unsaturation.

To ensure compatibility of the reactants and transparency of the cured polyorganosiloxane elastomer it is preferable that the silicon bonded hydrocarbon radicals present on the polydiorganosiloxane, organosiloxane copolymer and organohydrogensiloxane be identical. Most preferably these hydrocarbon radicals are methyl or a combination of methyl with up to about 5 mole percent of either phenyl or 3,3,3-trifluoropropyl,this preference being based on the availability of the intermediates used to prepare the organosiloxane copolymer.

The molar ratio of the combination of triorganosiloxy units and diorganovinylsiloxy units to $SiO_2$ units in the organosiloxane copolymer is from 0.6 to 1.1, inclusive. The copolymer preferably contains at least two vinyl radicals per molecule, and the vinyl radicals constitute from 1.5 to 3.5 weight percent of the copolymer.

In preferred embodiments of the copolymer the ranges for the molar ratio of diorganovinylsiloxy: triorganosiloxy:$SiO_2$ units is 0.08–0.1:0.6–1:1.

The organosiloxane copolymer can be prepared as described in U.S. Pat. No. 2,676,182, which issued to Daudt and Tyler on Apr. 20, 1954 and is hereby incorporated in this specification by reference thereto. The copolymers described in this patent contain from 2 to 23 percent by weight of hydroxyl groups, which is considerably above the maximum level of about 0.8 weight percent preferred for use in the present compositions. The hydroxyl content of the copolymer can be conveniently reduced to the desired level by employing a higher concentration of triorganosiloxane capping agent than the concentration range taught by Daudt et al.

Briefly, the method of Daudt et al. comprises reacting a silica hydrosol under acidic conditions with the appropriate amount of hexamethyldisiloxane or trimethylchlorosilane. The organosiloxane copolymers used in the present compositions can be obtained by reacting Daudt et al's. product with the required amount of a hexaorganodisilazane or a hexaorganodisiloxane wherein each silicon atom contains a vinyl radical and two methyl or other hydrocarbon radicals represented by R'" in the foregoing formula.

Alternatively, the silica hydrosol of Daudt et al. can be replaced with an alkyl orthosilicate and the triorganohalosilane with a triorganoalkoxysilane.

The Ratio of Polydiorganosiloxane To Organosiloxane Copolymer

The relative concentrations of polydiorganosiloxane and organosiloxane copolymer in a curable composition of this invention determine the extent to which the viscosity of the composition is reduced relative to the viscosity of the polydiorganosiloxane. In the absence of other reinforcing agents the concentration of organosiloxane copolymer will also affect the tensile strength, tear strength and other physical properties of the elastomers prepared from the curable composition.

At relatively low concentrations of organosiloxane copolymer. e.g. from 1 up to about 5 percent, there is no substantial reduction in viscosity of the curable composition relative to the polydiorganosiloxane nor is there any substantial contribution by the copolymer to the physical properties of the cured elastomer.

The maximum reduction in viscosity of the curable composition occurs when the organosiloxane copolymer constitutes from about 20 to about 35 percent of the combined weight of this copolymer and the polydiorganosiloxane. As discussed hereinbefore, the point within this range of copolymer concentration at which maximum viscosity reduction occurs appears directly proportional the molecular weight of the polydiorganosiloxane. Beyond this concentration level the viscosity of the mixture increases as additional organosiloxane copolymer is added until the viscosity of the mixture reaches the viscosity or the unmodified polydiorganosiloxane, which occurs at between 30 and 45 weight percent of the copolymer based on the weight of the polydiorganosiloxane.

The Organohydrogensiloxane

The polydiorganosiloxane and the organosiloxane copolymer are cured to form an elastomer by a hydrosilation reaction with an organohydrogensiloxane containing at least 3 silicon-bonded hydrogen atoms per molecule. The organohydrogensiloxane contains from as few as four silicon atoms per molecule up to an average of 20 or more, and can have a viscosity of up to 10 Pa.s or higher at 25° C. The repeating units present in this ingredient include but are not limited to $HSiO_{1.5}$, $R''''HSiO$ and/or $R''''_2HSiO_{0.5}$ in addition to one or more of monoorganosiloxy, diorganosiloxane, triorganosiloxy and $SiO_2$ units. In these formulae $R''''$ represents a monovalent hydrocarbon or halocarbon radical as defined hereinabove for the R radical of the polydiorganosiloxane.

Alternatively the organohydrogensiloxane can be a cyclic compound containing diorganosiloxane and organohydrogensiloxane units or a compound of the formula $Si(OSiR''''_2H)_4$.

To ensure compatibility between the ingredients of the present curable compositions the hydrocarbon radical represented by $R''''$ is most preferably methyl and the organohydrogensiloxane is a linear trimethylsiloxy terminated dimethylsiloxane/methylhydrogensiloxane copolymer containing an average of from 10 to about 50 repeating units per molecule of which from 3 to 5 are methylhydrogensiloxane.

The molar ratio of the silicon-bonded hydrogen atoms present in the organohydrogensiloxane to the vinyl radicals present in the polydiorganosiloxane and the organosiloxane copolymer determines the extent of cure of the present compositions and the physical properties of cured elastomers prepared from these compositions. This ratio is typically from 0.2 to about 5.

The Platinum-Containing Catalyst and Optional Inhibitor

The reaction between (1) vinyl-containing organosilicon compounds such as the present polydiorganosiloxanes and organosiloxane copolymers and (2) organohydrogensiloxanes are typically conducted in the presence of a catalyst that is a platinum group metal or a compound of such a metal. Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593 that issued to David N. Willing on Dec. 31, 1968. Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of at least about 70° C.

The platinum containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned vinyl-containing organosilicon compounds, organohydrogensiloxanes and platinum-containing catalysts may begin to cure at ambient temperature. To increase the storage stability of these compositions or obtain a longer working time or "pot life", the activity of the catalyst under ambient conditions can be retarded or suppressed by the addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol and acetylenic hydrocarbons such as ethynylcyclohexane constitute a preferred class of inhibitors that will suppress the activity of a platinum-containing catalyst at 25° C. Compositions containing these catalysts typically require heating at temperatures of 70° C. or above to cure at a practical rate.

If it desired to increase the pot life of a curable composition under ambient conditions, this can be accomplished using an olefinically substituted siloxane of the type described in U.S. Pat. No. 3,989,667, which issued on Nov. 2, 1876 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

Optional Ingredients

In addition to the ingredients described in the preceding sections of this specification the curable compositions of this invention can contain additional ingredients to modify the physical and other properties of the composition. These ingredients include but are not limited to reinforcing and nonreinforcing fillers, various stabilizers, pigments and flame retarding agents.

Reinforcing fillers such as silica improve the physical strength of the composition both during processing and following curing. Reinforcing silica fillers typically have a surface area of from 150 to greater than 400 $m^2/g$. These fillers are known in the art and are commercially available. The amount of reinforcing filler can vary from 10 to as much as 100 weight percent, typically from 15 to 75 weight percent, based on the weight of polydiorganosiloxane.

The reinforcing filler is typically treated with an anti-crepe hardening agent to prevent or inhibit an interaction between the polydiorganosiloxane and the filler that may increase the viscosity of the curable composition to the extent that it becomes unprocessable. Treatment of the filler can occur before the filler is combined with the other ingredients of the curable composition. Alternatively, the filler can be treated in-situ during preparation of the curable composition.

The anti-crepe hardening agent is typically a hydroxyl-substituted organosilicon compound such as a silane, organosiloxane, or a compound such as hexamethyldisilazane that reacts in the presence of water to yield a hydroxyl-substituted organosilicon compound.

The curable composition may contain an extending filler to increase the bulk of the composition. This helps to lower the cost of the finished part as the extending fillers are much lower in cost than the present organosilicon reactants. When an extending filler such as ground quartz is present in a curable composition, the tensile strength of the cured organosiloxane elastomer may be lower than that elastomers prepared from compositions in which the filler is absent. The amount of tensile strength lost is dependent upon the relative concentration of extending filler used as well as the nature of the polydiorganosiloxane and organohydrogensiloxane.

The siliceous extending fillers used with present compositions are finely ground particles of heat stable inorganic materials with an average particle size of under 25 micrometers. The finest extending fillers approach a particle size and configuration such that they have a surface area of as high as 50 $m^2/g$. Examples of siliceous extending fillers useful in this invention include ground quartz, diatomaceous earth, and glass.

About 25 weight percent of extending filler based on the weight of curable composition is necessary to significantly lower the cost of the composition. As much as 300 weight percent of some extending fillers may be used where the lowest cost is necessary. A preferred level of extending filler is from 25 to 200 weight percent, based on the curable composition. The preferred siliceous extending fillers are ground quartz and diatomaceous earth, with the most preferred filler being ground quartz with an average particle size of about 5 micrometers.

In those instances when it is desired to produce an optically transparent cured elastomer the siliceous reinforcing and extending fillers are typically omitted from the curable composition. This is particularly true if the cured elastomer is to be incorporated into light transmitting devices such as windows, windshields and lenses or used as coatings for optical fibers.

The curable organosiloxane compositions of this invention are prepared by any suitable means that will produce a homogeneous mixture of the various ingredients. Methods of mixing that are common in the silicone rubber art and which are suitable for this invention include mixing with a dough mixer, a rubber compounding mill, or with a Banbury mixer. Pourable compositions can be blended using a motor driven stirrer.

The order in which the various ingredients are added during preparation of the curable composition is not critical, although the platinum compound is typically added last to prevent premature curing of the composition.

If it is desired to store the present compositions for any length of time prior to curing, the composition can be divided into two parts that are combined just prior to curing. To achieve storage stability the organohydrogensiloxane and said platinum-containing catalyst are located in different parts of the two-part composition. Typically one part of the composition comprises a portion of the polydiorganosiloxane(s), the resinous organosiloxane copolymer and the organohydrogensiloxane, and the second part comprises the remainder of the polydiorganosiloxane(s), and organosiloxane copolymer, the platinum-containing catalyst and any catalyst inhibitor for extending the working time of the curable composition once the parts of the composition are combined.

The compositions of this invention can be cured under any condition that will promote the platinum-catalyzed hydrosilation reaction. Heating is preferred to accelerate curing, and is required if the composition contains a platinum catalyst inhibitor. The time and temperature necessary to effect curing are dependent upon the type and concentration of catalyst, the method of heating, the method of shaping the curable composition to the desired configuration, and the thickness of the cured article. The temperature that is appropriate for a given set of conditions is well known in the silicone rubber art. Typical temperatures are from 110° C. to 175° C. for molding operations to as high as 250° C. for the ovens used in continuous hot air vulcanization operations.

Prior to or during curing the present compositions are typically shaped to the desired configuration using any of the well known methods of forming elastomeric compositions including press molding, injection molding, calendaring, and the extrusion of both supported and unsupported articles.

When an extending filler is added to lower the cost of a curable composition of this invention, the tensile strength of the cured elastomer is usually lower than that of the unextended curable composition. The tensile strength of the elastomer can be increased by post-curing it in an oven. Such a post-cure is typically of from 1 to 24 hours duration at a temperature of from 150° C. to 250° C.

The following examples describe preferred compositions of this invention and should not be interpreted as limited the scope of the invention defined in the accompanying claims. All viscosity measurements in the examples were obtained under ambient conditions using a Rheometrics(R) Dynamic Mechanical Spectrometer. Depending upon the particular composition being evaluated, the strain varied from 1 to 30% and the rotational speed of the rotating plate varied from 1 to 20 radians per second.

EXAMPLE 1

Mixtures of a dimethylvinylsiloxy terminated polydimethylsiloxane and a vinyl-containing organosiloxane copolymer of this invention were prepared by blending the polydimethylsiloxane and a 65% weight percent solution in xylene of an organosiloxane copolymer of this invention to homogeneity and then evaporating the xylene under reduced pressure. The viscosity of each of the resultant mixtures was measured and is recorded in the following Table I together with the viscosity of the initial polydimethylsiloxane and the weight percent of organosiloane copolymer. The molar ratio of the combination of trimethylsiloxy and dimethylvinylsiloxy units to $SiO_2$ units in the organosiloxane copolymer was 0.8. the copolymer contained 2.12 weight percent of vinyl radicals, and the molecular weight of the copolymer was about 30,000, measured using gel permeation chromatography.

The polydimethylsiloxanes evaluated exhibited viscosities of 12.9, 56.7 and 12,400 Pa.s under ambient conditions, and are designated as polymers A, B and C in Table I.

For purposes of comparison two dimethylvinylsiloxy-terminated polydimethylsiloxanes outside the scope of the present invention were also blended with the organosiloxane copolymer. These polymers exhibited viscosities of 0.4 and 2.7 Pa.s., and are designated as polymers D and E in Table I.

The conditions under which the viscosities of the various polydimethylsiloxane/copolymer mixtures were measured using the dynamic mechanical spectrometer were as follows:

| Polymer | % Strain | Rotational Speed Radians/Sec. |
|---|---|---|
| A | 5 | 20 |
| B | 30 | 5 |
| C | 1 | 1 |
| D | 30 | 30 |
| E | 5 | 30 |

TABLE I

| Weight % Copolymer | Viscosity In Pa.s of Mixture Containing Polymer | | | | |
|---|---|---|---|---|---|
| | A | B | C | D Control | E Control |
| 0 | 12.9 | 56.7 | 12,400 | 0.4 | 2.7 |
| 10 | 12.2 | — | 11,000 | — | 2.9 |
| 15 | 12.0 | — | — | 0.6 | 3.1 |
| 20 | 11.8 | — | — | — | 3.3 |
| 25 | 12.4 | — | 10,000 | 0.7 | — |
| 30 | 13.3 | 49.5 | 9,700 | — | — |
| 35 | — | 48.0 | 9,600 | 2.1 | 6.1 |
| 40 | — | 57.7 | 11,000 | — | — |

These data demonstrate the reduction in viscosity achieved with increasing organosiloxane copolymer concentration using mixtures containing polymers A, B and C of this invention. Mixtures prepared using the two control polydimethylsiloxanes (D and E) exhibited the expected increase in viscosity with increasing copolymer concentration.

EXAMPLE 2

The procedure, organosiloxane copolymer and measuring technique described in Example 1 were used to determine the effect of adding the copolymer to a dimethylvinylsiloxy-terminated diorganosiloxane copolymer containing 97 mol percent of dimethylsiloxane units and 3 mol percent of diphenylsiloxane units. This copolymer is referred to hereinafter as polymer F. The viscosities of polymer F and mixtures of polymer F and the organosiloxane copolymer are recorded in the following Table II.

TABLE II

| Organosiloxane Copolymer (%) | Viscosity (Pa.s) |
|---|---|
| 0 | 16.5 |
| 30 | 7.0 |
| 35 | 5.5 |
| 40 | 7.0 |

These data indicate that the viscosity decreased with addition of the organosiloxane copolymer until the mixture contained about 35 weight percent of this copolymer, at which point the viscosity began to increase again toward the viscosity of unmodified polymer F. of unmodified polymer F. (Please supply tensile properties for these compositions, if information is available)

EXAMPLE 3

Curable organosiloxane compositions of this invention were prepared by blending polymer B with the vinyl-containing organosiloxane copolymer of Example 1, a dimethylsiloxane/methylhydrogensiloxane copolymer containing about 0.7 weight percent of silicon bonded hydrogen atoms and about 38 mole percent of methylhydrogensiloxane units, a platinum hydrosilation catalyst comprising a reaction product of hexachloroplatinic acid and sym-tetramethyldivinyldisiloxane that has been diluted with a liquid dimethylsiloxy terminated polydimethylsiloxane in an amount sufficient to achieve a platinum content of 0.7 weight percent, and 0.01 percent, based on the weight of the curable composition, of ethynylcyclohexane as a platinum catalyst inhibitor.

The concentration of dimethylsiloxane/methylhydrogensiloxane copolymer was sufficient to provide 1.2 silicon-bonded hydrogen atoms for each vinyl radical present in the curable composition, and the amount of platinum catalyst was equivalent to 0.01 weight percent of platinum, based on the weight of the curable composition.

The resultant compositions were cured using a heated press to form 1.5 mm-thick sheets from which test samples were cut in accordance with ASTM test procedures D 412 for the measurement of tensile properties and D 1938 (die B) for measuring tear propagation resistance. The sheets were cured at 170° C. for 10 minutes and post-cured for one hour at 150° C.

The concentration of the vinyl-containing organosiloxane copolymer in each of the samples together with the tensile strength, elongation and tear strength of the test samples are recorded in the following Table III

TABLE III

| Weight % Copolymer* | Tensile Strength (MPa) | Elongation (%) | Tear Strength kN/m |
| --- | --- | --- | --- |
| 30 | 5.07 | 398 | 8.05 |
| 35 | 4.83 | 390 | 8.40 |
| 40 | 5.52 | 270 | 11.90 |
| 45 | 6.00 | 133 | 12.25 |
| 50 | 8.28 | 100 | 10.85 |

*Relative to weight of Polymer B

The data in Table II demonstrate a continual increase in the tear strength of the corresponding cured elastomer as the concentration of vinyl-containing organosiloxane copolymer in the curable composition is increased from 30 to 45 weight percent, and an 11% decrease in tear strength when the concentration of this copolymer is increased from 45 to 50 weight percent. The decrease in tear strength occurs above the range wherein the unique decrease in viscosity of the curable composition with increasing vinyl-containing copolymer concentration is observed, and indicates a relationship between this effect and the physical properties of cured elastomers prepared from the compositions.

EXAMPLE 4

This example demonstrates (a) the improvement in physical properties of a cured elastomer prepared using a composition of this invention wherein the polydiorganosiloxane is a gum, and (b) the effect of the type of organohydrogensiloxane on the physical properties of the cured elastomer.

Two curable compositions were prepared as described in Example 3 using the polydiorganosiloxane identified as Polymer C in Example 1 together with the same types and amounts of platinum catalyst, catalyst inhibitor and 50 weight percent, based on the weight of polydiorganosiloxane, of the vinyl-containing organosiloxane copolymer described in Example 1. In one composition (X) the organohydrogensiloxane was the same one described in Example 3, and the second composition (Y) contained a trimethylsiloxy terminated polymethylhydrogensiloxane containing about 1.6 weight percent of silicon-bonded hydrogen. In both compositions the molar ratio of silicon-bonded hydrogen atoms to vinyl radicals was 1.2.

The compositions were cured and evaluated as described in Example 3. and the properties of the resultant cured elastomers are recorded in the following Table IV.

TABLE IV

| Organohydrogen-siloxane | Tensile Strength(MPa) | Elongation (%) | Tear Strength kN/m |
| --- | --- | --- | --- |
| X | 4.14 | 78 | 19.25 |
| Y | 6.76 | 800 | 19.78 |

That which is claimed is:

1. In a curable composition comprising
   (1) a diorganovinylsiloxy-terminated polydiorganosiloxane,
   (2) an amount of a resinous organosiloxane copolymer sufficient to improve the physical properties of the elastomer obtained by curing said composition.
   (3) an amount of an organohydrogensiloxane sufficient to cure said composition, and
   (4) an amount of a platinum-containing hydrosilation catalyst sufficient to promote curing of said composition.

the improvement comprising (a) selecting said polydiorganosiloxane from those exhibiting a viscosity of at least 12 Pa.s at 25 degrees C. and wherein at least 95% of the repeating units are dimethylsiloxane units and any remainder are diorganosiloxane units wherein the organic groups bonded to silicon are monovalent hydrocarbon radicals or monovalent halogenated hydrocarbon radicals (b) selecting said organosiloxane copolymer from those consisting essentially of $SiO_2$, trimethylsiloxy and dimethylvinylsiloxy units, where the molar ratio of the combination of trimethylsiloxy and dimethylvinylsiloxy units to $SiO_2$ units is from 0.6 to 1.1, inclusive and said copolymer contains from 1.5 to 3.5 weight percent of vinyl radicals, and (c) maintaining the concentration of said organosiloxane copolymer within the range of from 1 to about 45 weight %, based on the weight of said polydiorganosiloxane to achieve a reduction in the viscosity of said composition relative to the viscosity of the composition in the absence of said copolymer.

2. A composition according to claim 1 where any silicon-bonded organic groups in said polydiorganosiloxane other than methyl are selected from the group consisting of phenyl and 3,3,3-trifluoropropyl, the viscosity of the polydiorganosiloxane is up to 12,500 Pa.s and the concentration of said copolymer is from 5 to 35 weight percent.

3. A composition according to claim 2 where said polydiorganosiloxane is a polydimethylsiloxane or a copolymer containing 97 mol percent dimethylsiloxane units and 3 mol percent diphenylsiloxane units, the organohydrogensiloxane is a dimethylsiloxane/methylhydrogensiloxane copolymer, the platinum catalyst is a complex of hexachloroplatinic acid and a low molecular weight vinyl-containing organosiloxane compound and is present in an amount equivalent to 5 to 50 parts of platinum per million parts of curable composition and the molar ratio of silicon-bonded hydrogen atoms in said organohydrogensiloxane to the vinyl radicals present in the combination of said polydiorganosiloxane and said organosiloxane copolymer is from 0.2 to 5.

4. A composition according to claim 3 where said platinum catalyst is a reaction product of hexachloroplatinic acid and sym-tetramethyldivinyldisiloxane and the composition contains a platinum catalyst inhibitor.

5. A composition according to claim 1 where said composition is in two parts with said organohydrogensiloxane and said platinum-containing catalyst being located in different parts of said composition.

6. A composition according to claim 5 where each of said parts contains a portion of said polydiorganosiloxane and said resinous organosiloxane copolymer.

* * * * *